(12) United States Patent
Ogawa et al.

(10) Patent No.: US 6,274,069 B1
(45) Date of Patent: Aug. 14, 2001

(54) MULTILAYERED SEAT HAVING DIFFERENT HARDNESSES AND PROVIDED WITH FACE MATERIAL, AND METHOD OF MANUFACTURING SAME

(75) Inventors: Taro Ogawa; Yasumasa Senoo; Takeshi Watadani; Yasuyuki Toda, all of Kurashiki (JP)

(73) Assignee: Namba Press Works Co., Ltd., Kurashiki (JP)

( * ) Notice: Subject to any disclaimer, the term of this patent is extended or adjusted under 35 U.S.C. 154(b) by 0 days.

(21) Appl. No.: 09/202,743

(22) PCT Filed: Dec. 3, 1996

(86) PCT No.: PCT/JP96/03533

§ 371 Date: Dec. 16, 1998

§ 102(e) Date: Dec. 16, 1998

(87) PCT Pub. No.: WO98/00276

PCT Pub. Date: Jan. 8, 1998

(30) Foreign Application Priority Data

Jul. 1, 1996 (JP) .................................... 8-188054

(51) Int. Cl.[7] ................................... B29C 39/00
(52) U.S. Cl. ........................... 264/46.8; 264/55; 156/286
(58) Field of Search .................. 264/46.4, 46.6, 264/46.8, 55; 156/285, 286, 245; 297/DIG. 1

(56) References Cited

U.S. PATENT DOCUMENTS

| 4,976,414 | 12/1990 | Yanagishita ........................ 260/420 |
|---|---|---|
| 5,372,668 | * 12/1994 | Bracesco . |
| 5,466,404 | * 11/1995 | Kiefer . |
| 5,679,193 | * 10/1997 | Yates . |
| 5,679,197 | * 10/1997 | Haupt et al. . |
| 5,891,293 | * 4/1999 | Kelly et al. . |
| 6,093,351 | * 7/2000 | Ogawa et al. . |

* cited by examiner

Primary Examiner—Milton Nelson, Jr.
(74) Attorney, Agent, or Firm—Renner, Kenner, Greive, Bobak, Taylor & Weber

(57) ABSTRACT

A seat, which is covered with a surface material and has a multilayer with different hardness, the air permeability, a good feeling on the surface and such a hardness that a weight of a person can be supported, is provided. The seat (1) is covered with a surface material (2) having the air permeability and comprises a foamed body having an outline generally corresponding to an outline of the seat. The foamed body comprises a first foamed body (10) as a base of the foamed body and a second foamed body (6). The second foamed body (6) is resulted in one with a back surface of the surface material and is also resulted in one with a front surface of the first foamed body by: injecting and laminating a liquid foamable mixture on the front surface of the first foamed body and then by pressing and compressing the laminated liquid foamable mixture in the first foamed body and a pressure applying mold having a molding surface and positioned on the surface material on the laminated liquid foamable mixture and simultaneously sucking through a suction slot provided in the pressure applying mold, when the laminated liquid foamable mixture has completed a gas reaction thereof but is still in a visco-elastic flowing condition.

14 Claims, 5 Drawing Sheets

MULTILAYERED SEAT HAVING DIFFERENT HARDNESSES AND PROVIDED WITH FACE MATERIAL, AND METHOD OF MANUFACTURING SAME

TECHNICAL FIELD

The present invention relates to a seat typically used for a car and also relates to a seat used for an industrial vehicle such as a forklift, a tractor and the like and a seat of a chair used in an office or as a furniture. In particular, the present invention relates to a seat in which a surface material thereof is integrated in one with a foamed body having a variety of hardness.

BACKGROUND OF THE ART

A conventional method for manufacturing a seat having a different hardness and comprising a surface material and a foamed body integrated in one with the surface material is shown in FIG. 8 (this manufacturing method is disclosed in Japanese Patent Application No. Heisei 7(1995)-339895). This manufacturing method is carried out as follows.

Firstly, a liquid foamable mixture 82 such as a polyurethane foam and the like is injected and laminated on a first foamed body 81 as a base of a foamed body. A surface material 80 comprises a central surface portion 80' and side surface portions 80", 80'" stitched on both sides thereof. The surface material 80 is then disposed so that the central surface portion 80' is positioned on the laminated mixture 82 and the side surface portions 80", 80'" are positioned on both sides of the first foamed body 81, respectively.

Then, a pressure applying mold 84, which has a molding surface 83 having a shape corresponding to a shape of a central portion of the seat, is lowered; and the liquid foamable mixture 82 is pressed and compressed together with the surface material 80 by the pressure applying mold 84 and the first foamed body 81 when the liquid foamable mixture 82 is reacting i.e. when the mixture has completed a gas reaction thereof but is still in a visco-elastic flowing condition.

When the mixture is pressed and compressed in such a viscoelastic flowing condition, the mixture is easily deformed while the surface material is pushed back by an reactive force against the pressure applied to the mixture, and as a result, the mixture is molded together with the surface material into a shape corresponding to the molding surface of the pressure applying mold. Then, when the mixture is transformed into a solid condition, the second foamed body is formed, and when this, a back surface of the surface material 80 is integrated with the upper side of the second foamed body and the first foamed body 81 is integrated with the lower side of the second foamed body. It should be noted that a seat covered with a surface material and having a multilayer having a variety of hardness can be manufactured by changing the degree of hardness of the first foamed body and that of the second foamed body, respectively, i.e. by changing the compressibility and the like when compressing and molding the second foamed body.

As aforementioned, according to this conventional method, the first foamed body can be integrated with the second foamed body without use of a lower mold and a seat having the surface material fixed in one with the second foamed body and having a shape corresponding to the molding surface of the pressure applying mold can be manufactured.

As aforementioned, the surface material is pushed on the molding surface of the pressure applying mold by the reactive force when the foamable mixture is pressed. However, when a deep channel is provided in the molding surface of the pressure applying mold or when the molding surface of the pressure applying mold has a three dimensional complicated geometry, the reactive force of the foamable mixture is too small to form the surface material along such a complicated geometry of the molding surface of the pressure applying mold and the foamable mixture is crushed. As the result, a shape of the surface material is faded as shown in FIGS. 9A and 9B, i.e. a seat precisely following the molding surface of the pressure applying mold can not be manufactured.

In such a case, in the conventional technique, as shown in FIGS. 10A and 10B, suction slots (or slits) 101 are entirely provided in the pressure applying mold 100, and a pressure difference is provided between an inside of the surface material 102 and an outside thereof by decompressing an inside of the pressure applying mold so that the surface material can follow the surface shape of the pressure applying mold. However, a large pressure difference is required to follow the surface material along the surface shape of the pressure applying mold. The pressure difference is determined by the air permeability (i.e. a rate of air passing through or communicating in the surface material). However, in a textile typically used, it is difficult to reduce the air permeability which can achieve such a pressure difference produced by sucking such that the textile can be formed along the molding surface having a three dimensional complicated geometry. Thus, when such a typically used surface material is used, a seat having a three dimensional complicated geometry and a deep channel can not be manufactured by this pressure applying mold having the suction slots.

In use of the surface material having such an air permeability, a thermoplastic film 1021" is laminated on a back surface thereof to prevent air penetration of the surface material and is sucked to shape the surface material, as shown in FIGS. 10A and 10B. Then, the plastic film 102" is heated and softened by a heater 103 to deform the plastic film 102" permanently, and the surface material is held so that the surface material 102' can be deformed into a shape corresponding to a shape of the molding surface of the pressure applying mold. In use of such a material for preventing air penetration, not only a cost of a raw material but also the number of manufacturing steps is increased, and as a result, the whole cost is increased and the productivity is worse.

The present invention is to solve the aforementioned problem and an object thereof is to provide a seat having a surface shape corresponding to a molding surface of a mold in which a surface material thereof is integrally formed with a foamed body and to provide a method for manufacturing such a seat.

Another object of the present invention is to provide a seat in which a surface material having air permeability can be used and to provide a method for manufacturing such a seat.

Still another object of a present invention is to provide the seat in which it is not necessary to laminate a film, which is for preventing air penetration, on a back surface of the surface material and to provide a method for manufacturing such a seat.

Yet another object of a present invention is to provide the seat in which the degree of hardness of an upper layer which contacts with a person is soft and that of a lower layer which supports a weight of the person is hard and to provide a method for manufacturing such a seat.

Yet still another object of a present invention is to provide the seat in which the degree of hardness of the upper layer is partially different and to provide a method for manufacturing such a seat.

DISCLOSURE OF THE INVENTION

A seat according to the present invention is covered with a surface material having air permeability and comprises a foamed body having an outline generally corresponding to an outline of the seat. The foamed body comprises a first foamed body as a base of the foamed body and a second foamed body. The second foamed body is integrally formed with a back surface of the surface material and is also integrally formed with a front surface of the first foamed body by injecting and laminating a liquid foamable mixture on the front surface of the first foamed body and then by pressing and compressing the laminated liquid foamable mixture in the first foamed body and a pressure applying mold having a molding surface and positioned on the surface material on the liquid foamable mixture and by simultaneously sucking through a suction slot provided in the pressure applying mold, when the laminated liquid foamable mixture has completed a gas reaction thereof but is still in a visco-elastic flowing condition.

The visco-elastic flowing condition is defined as a condition until a tack free before the liquid foamable mixture is completely transformed into a solid after the gas reaction of the liquid foamable mixture is completed, in which an inner portion of the liquid foamable mixture has been partially foamed but a surface portion thereof is in a flowing condition so that the mixture can be easily deformed by applying an external force.

A method according to the present invention for manufacturing a seat in which the seat includes a surface material having air permeability and a foamed body integrally formed with the surface 20 material and the foamed body has an outline generally corresponding to an outline of the seat and comprises a first foamed body as a base thereof and a second foamed body integrally formed with the first foamed body, includes the steps of:

injecting and laminating a liquid foamable mixture, which forms the second foamed body, on a front surface of the first foamed body;

disposing the surface material on the first foamed body;

pressing and compressing the laminated liquid foamable mixture in the first foamed body and a pressure applying mold having a shape corresponding to a shape of a central portion of the seat and positioned on the surface material and simultaneously sucking through a suction slot provided in the pressure applying mold, when the laminated liquid foamable mixture has completed a gas reaction thereof but is still in a visco-elastic flowing condition.

The suction slot of the pressure applying mold is provided at least in a position corresponding to a sucked molding portion of the second foamed body.

This sucked molding portion is defined as a portion which is molded into a desired shape following a molding surface of the pressure applying mold by sucking the liquid foamable mixture together with the surface material.

Sucking into the pressure applying mold is carried out through a part of the suction slot, and the air permeability between the inside and the outside of the pressure applying mold can be free through another part of the suction slot. Alternatively, a plurality of suction slots can be provided in the pressure applying mold so that sucking can be carried out by a part of the suction slots provided in a portion corresponding to the sucked molding portion of the second foamed body and the air permeability between the inside and the outside of the pressure applying mold can be free through another part of the suction slots.

Injecting and laminating the liquid foamable mixture is carried out before or after the surface material is disposed thereon.

In order to partially change the degree of hardness of the first foamed body, it is desirable that the compressibility to the liquid foamable mixture when the liquid foamable mixture is pressed and compressed is partially changed when the liquid foamable mixture has completed the gas reaction thereof but is still in the visco-elastic flowing condition. It is desirable that the compressibility is changed by partially changing a space between the pressure applying mold and the first foamed body, injecting and laminating the liquid foamable mixture on the first foamed body in the same thickness, and then pressing and compressing the laminated mixture.

It is desirable that the degree of hardness of the first foamed body is different from that of the second foamed body. It is desirable that the first and the second foamed bodies are made of a reactive foamable resin selected from a group consisting of a polyurethane foam and a polyurea foam.

A fabric or a knitted textile material having air permeability can be used for the surface material, and a plate material of a slab urethane foam can be provided on a back surface of the surface material.

A part of the liquid foamable mixture which is injected and laminated on the first foamed body and forms the second foamed body is impregnated into the first foamed body so that an impregnated layer is formed, and as the result, a whole of the foamed body becomes a composite material having low air permeability.

Then, the laminated liquid foamable mixture is pressed and compressed in the first foamed body and the pressure applying mold when the laminated liquid foamable mixture has completed the gas reaction thereof but is still in the visco-elastic flowing condition, and thereby the reactive force against a pressure applied to the mixture is produced in the mixture and simultaneously the composite material having the low air permeability is sucked by the pressure applying mold, so that a large pressure difference can be created between the inside of the composite material and the suction side.

The mixture in the visco-elastic flowing condition is attracted toward the suction side together with the surface material by the reactive force and the pressure difference and is then transformed into a solid, and as a result, the second foamed body is integrally molded with the surface material and the first foamed body and has a shape corresponding to a shape of the molding surface of the pressure applying mold.

In the seat of the present invention manufactured by such a manner, the surface material is integrally formed with the foamed body, and thus, the surface material can be restored into the original state by the resiliency of the foamed body when a weight of a person who sits thereon is released. In addition, the surface material has air permeability, and thus, the seat is resilient and gives a comfortable feeling.

Moreover, the degree of hardness of the second foamed body can be partially changed by partially changing a space between the pressure applying mold and the first foamed body, and thus, if the seat is molded so that a circumferential portion thereof is hard, a central portion thereof is maintained soft and simultaneously the holding ability of the seat can be improved.

The degree of hardness of the first foamed body can be selected independently of the second foamed body, and thus, the degree of hardness of the first foamed body can be provided so that the weight of a person who sits on the seat can be supported.

BEST MODE FOR CARRYING OUT THE INVENTION

Embodiments of the present invention are described with reference to the drawings.

Figure 1A:
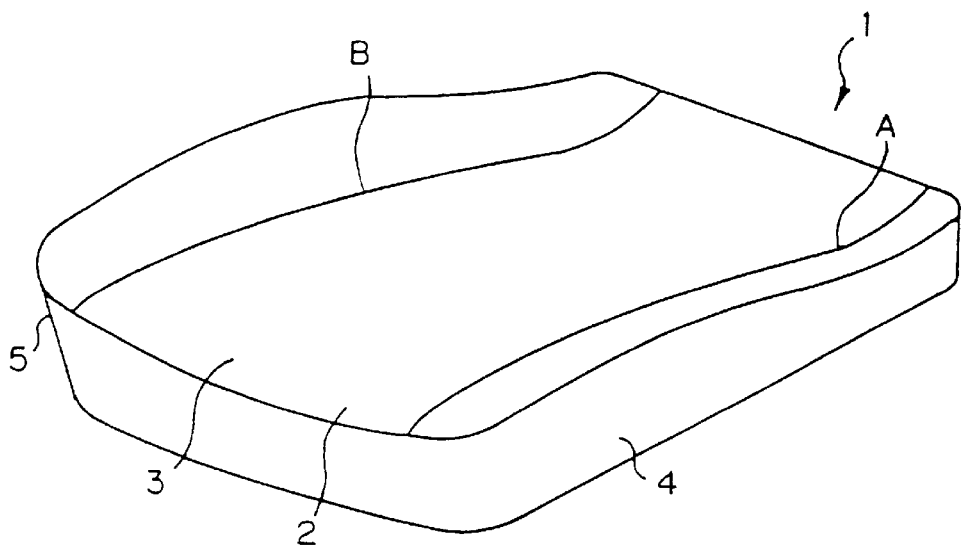
FIG. 1A is a perspective view of a seat according to the present invention.
Figure 1B:
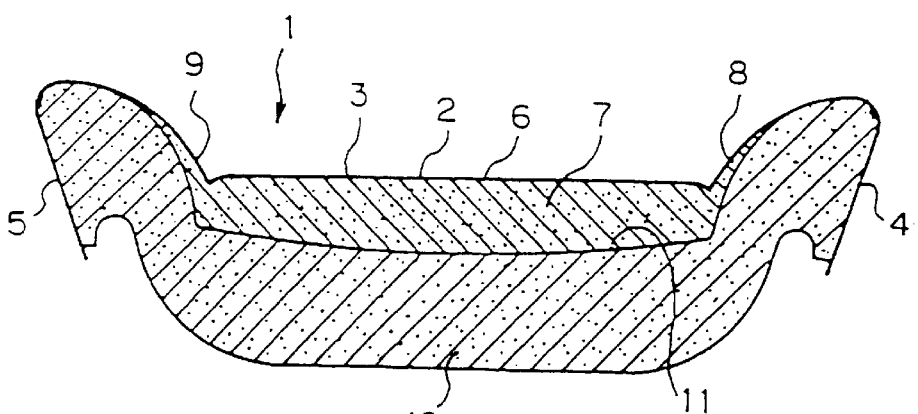
FIG. 1B is a cross sectional view of the seat.

FIG. 1A is a perspective view of a seat manufactured by a method according to the present invention, and FIG. 1B is a cross sectional view of the seat. The seat 1 is composed of a surface material 2, a first foamed body 10 as a base and a second foamed body 6 positioned thereon, and an outline of the seat 1 is formed by a combination of those components.

The surface material 2 is formed of a central surface portion 3 which covers the second foamed body 6 (and forms a central portion of the seat) and side surface portions 4, 5 which are continued from the sides thereof and cover the second foamed body. A back surface of the central surface portion 3 is integral with the second foamed body 6, and a lower surface 11 of the second foamed body 6 is integral with the first foamed body 10.

In the seat of FIGS. 1A and 1B, the central surface portion 3 and the side surface portions 4, 5 as members of the surface material are separately cut from a material or materials and are connected by stitching those members. Alternatively, one member as the surface material can be cut from a material and can be used.

The surface material 2 used herein is not specified, i.e. a fabric or a knitted textile material generally used as a surface material of a car seat can be used.

The first foamed body 10 has an outline generally corresponding to an outline of the seat and is a base of the seat. The first foamed body 10 is integrally formed with the second foamed body 6 by a manufacturing method as described in the following.

The first foamed body 10 can be made of a foamed body such as a polyurethane foam and, in the alternative, can be made of a foamed body of a reactive foamable resin such as a polyurea foam.

The second foamed body 6 comprises a central body portion 7, which has a generally uniform thickness, and circumferential portions 8, 9, which are continued from both sides thereof and are gradually thinned.

This second foamed body 6 is a foamed body of a reactive foamable resin selected from a group consisting of a polyurethane foam , polyurea foam and the like, similar to the first foamed body 10.

The degree of hardness of the second foamed body 6 may be uniform over the whole of the foamed body 6, and in the alternative, it is desirable that the degree of hardness of the circumferential body portions 8, 9 is harder than that of the central body portion 7 in order to improve the holding ability of a person who sits on the seat and to maintain the outline of the seat, in accordance with a method for manufacturing the second foamed body as described in the following.

With respect to the degree of hardness of each foamed body, it is desirable that the second foamed body 6 is soft and the first foamed body 10 is harder than the second foamed body 6. This is because the seat becomes comfortable to sit on by making the second foamed body soft so the weight of a person who sits thereon can be supported, the holding ability can be improved and the outline of the seat can be maintained by making the first foamed body harder. In the alternative, when cushioning ability is required, the first foamed body can be much softer.

Figure 9A:
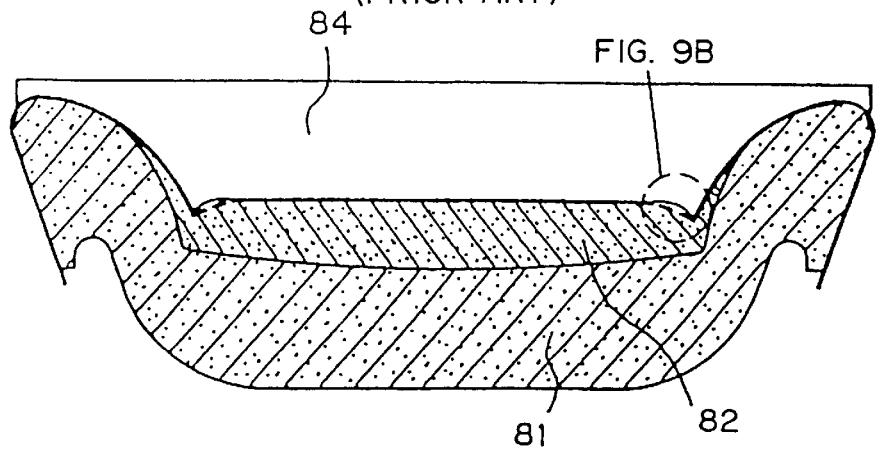
FIG. 9A is a cross sectional view and FIG. 9B an enlarged portion thereof of an arrangement of pressing and compressing the liquid foamable mixture, which forms the second foamed body, in the first foamed body and the pressure applying mold in accordance with the conventional method shown in FIG. 8.
Figure 9B:
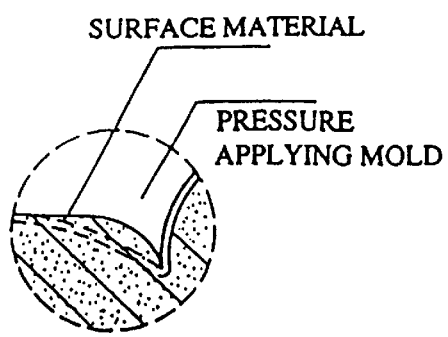
Figure 10A:
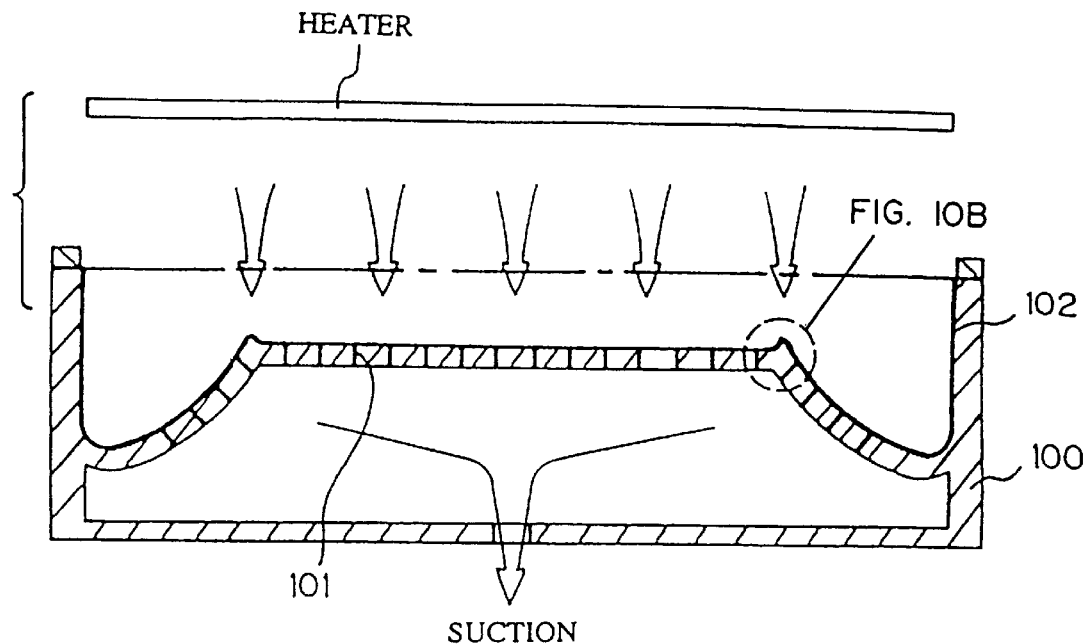
FIG. 10A is a cross sectional view and FIG. 10B an enlarged portion thereof of an arrangement of sucking and shaping a surface material along a surface of a mold by use of a conventional pressure applying mold having suction slots, a back surface of the surface material being laminated by a plastic film.
Figure 10B:
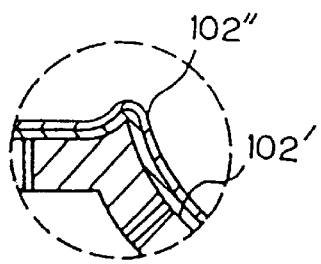

As shown in FIGS. 1A and 1B, in the seat 1 of the present invention, relatively deep channels A, B are formed therein. In the conventional method, such deep channels can not be formed because shapes of those channels are crushed and faded when pressing and compressing the foamable mixture (see FIGS. 9A and 9B). In contrast, in the method of the present invention, a seat having such channels and more complicated geometries can be manufactured.

We now consider a method for manufacturing the seat according to the present invention.

The first foamed body 10 as the base of the seat is manufactured by a conventional method. That is, the first foamed body 10 is manufactured by providing a foaming mold comprising an upper mold and a lower mold for molding the first foamed body 10, injecting a liquid foamable mixture such as a polyurethane foam and the like in the lower mold, and foaming and molding by the upper and the lower molds. It should be noted that this first foamed body 10 is used as a lower mold to form the second foamed body 6 as described in the followings.

Figure 2:
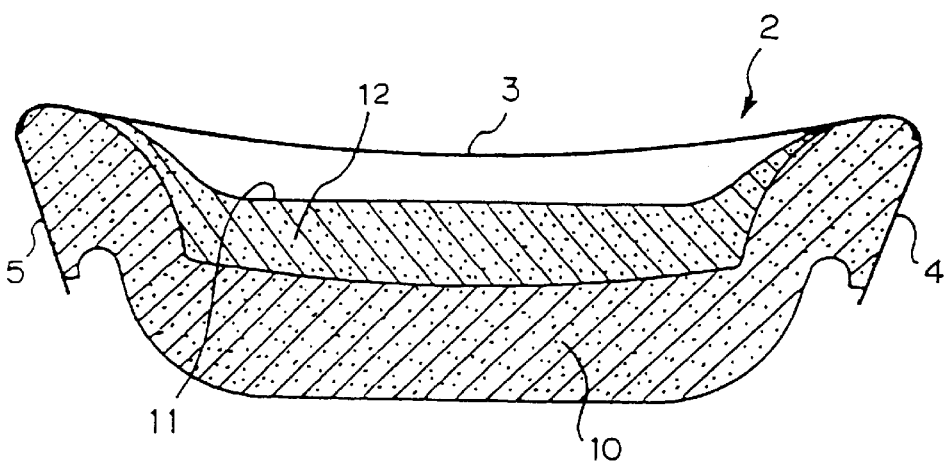
FIG. 2 is a cross sectional view of an arrangement of a first foamed body, a liquid foamable mixture injected and laminated thereon and a surface material covered thereon.

Then, the liquid foamable mixture 12 is injected and laminated over a whole area on the first foamed body 10 by, for example, a spraying method, as shown in FIG. 2. When this, a part of the mixture 12 contacts the front surface of the first foamed body 10 it is impregnated through the front surface of the first foamed body 10 to form an impregnated layer. In this embodiment, the mixture of a reactive foamable resin of a polyurethane foam is used. In the alternative, a mixture of a reactive foamable resin of a polyurea foam and the like can be used.

The surface material comprising the central surface portion 3 and side surface portions 4, 5 stitched on both sides thereof is disposed so that the central surface portion 3 is positioned on the laminated mixture 12 and the side surface portions 4, 5 are positioned on both sides of the first foamed body 10.

Figure 3A:
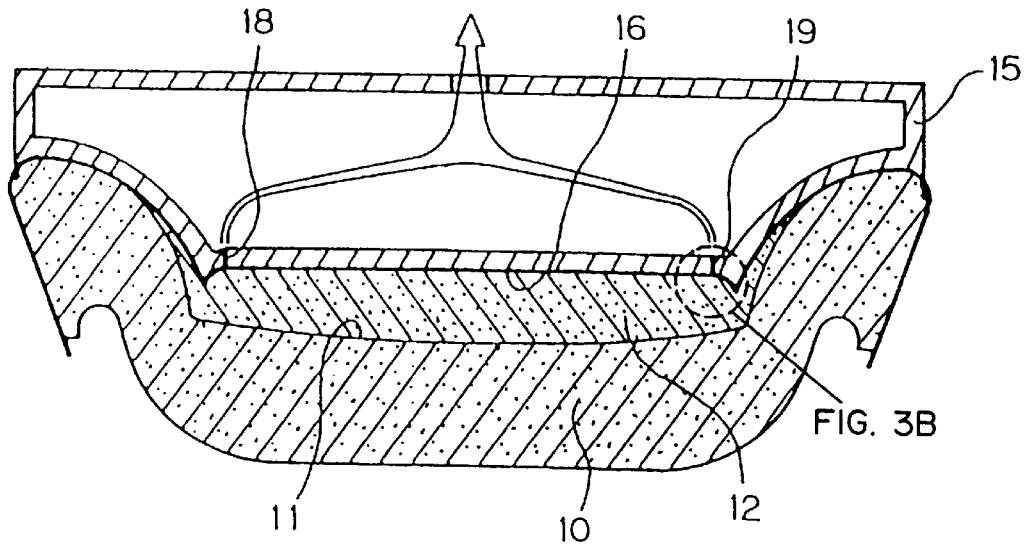
FIG. 3A is a cross sectional view and FIG. 3B an enlarged portion thereof of an arrangement of a first foamed body, a liquid foamable mixture injected and laminated thereon, a surface material covered thereon, and a pressure applying mold, wherein the liquid foamable mixture is pressed and compressed together with the surface material by the first foamed body and the pressure applying mold.
Figure 8:
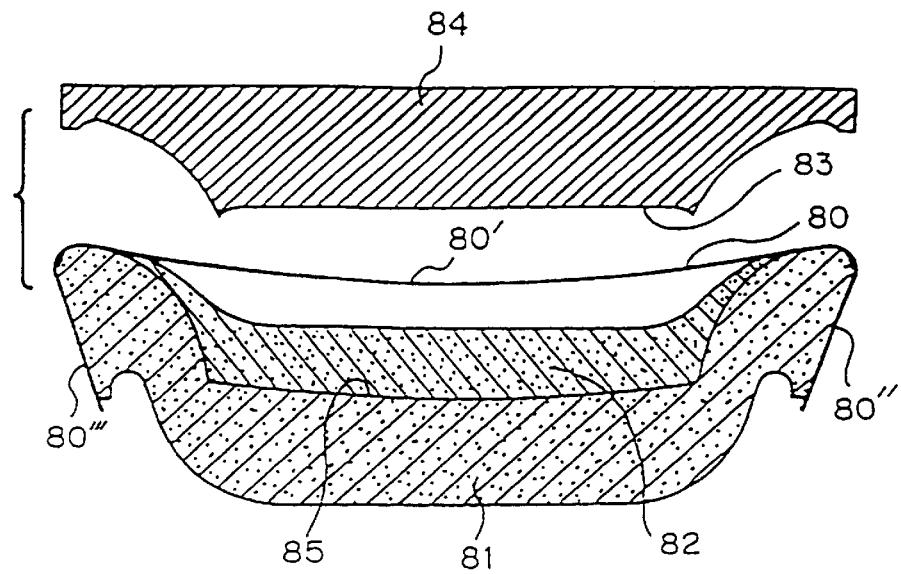
FIG. 8 is a cross sectional view of an arrangement before a liquid foamable mixture, which forms a second foamed body, is pressed and compressed in a first foamed body and a pressure applying mold, in accordance with a conventional method.

Then, a pressure applying mold 15 is positioned above the surface material (FIG. 3A). An outline of the pressure applying mold 15 is similar to the outline of the conventional pressure applying mold (see FIG. 8), and the molding surface 16 thereof is formed so that a three dimensional shape of the second foamed body 6 can be defined by the molding surface and an upper surface 11 of the first foamed body 10. In addition, the central portion 3 of the surface material 2 corresponds to the molding surface 16 of the pressure applying mold 15.

Moreover, this pressure applying mold 15 is hollow, and as shown in FIG. 2, a plurality of suction slots 18, 19 are provided at positions corresponding to standing up portions about the channels A, B of the seat 1. Those standing up portions are the faded portions in the conventional method i.e. the mixture in the visco-elastic flowing condition is crushed when pressing and compressing, and thus, the shape thereof can not follow the surface of the mold in the conventional method(see FIGS. 9A and 9B).

In the pressure applying mold 15 shown in the figure, the whole of the inside thereof is hollowed, and in the alternative, if it is possible to suck through the suction slot, it is not necessary to be entirely hollow.

For example, a decompression space may be provided only above the suction slots to suck by decompressing the decompression space. In the alternative, without such a decompression space, the suction slots may be connected with an external vacuum source through a pipe.

The suction slots are is preferably formed of a plurality of slots and, in the alternative, are formed of a slit-shaped slot. While the suction slots are aligned in one line each in respective left and right sides in this embodiment, the suction slots can be aligned in a plurality of lines each dependent on the shape of the standing up portion, the pressing and compressing condition, the size of the seat and the like. Also, the size of the slots can be determined dependent on such a pressing and molding condition.

The pressure applying mold 15 is connected with an external vacuum source to evacuate air from the inside thereof.

In the aforementioned embodiment, the pressure applying mold 15 is positioned after the mixture 12 is laminated and the surface material 2 is disposed, however, such an order is not an essence of the present invention and may be reversed.

Figure 3B:
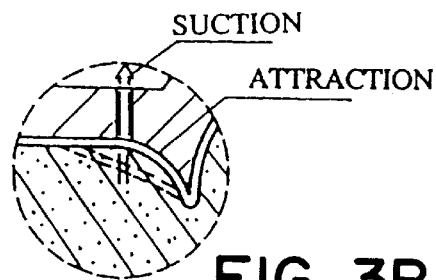

Then, as shown in FIGS. 3A and 3B, the pressure applying mold 15 is evacuated and is simultaneously lowered, and the laminated liquid foamable mixture 12 is pressed and compressed together with the surface material 2 when the laminated liquid foamable mixture 12 has completed a gas reaction thereof but is still in the visco-elastic flowing condition.

The reactive foamable resin, such as a polyurethane foam, polyurea foam and the like, used herein results in a stable foamed body having excellent resilient characteristics after the liquid foamable mixture thereof is reacted and is completely foamed and molded. This foamed body is not easily deformed even if this foamed body is pressed and compressed.

However, the laminated mixture is in a very unstable condition during the reaction thereof, i.e. the laminated mixture is remaining in the condition (visco-elastic flowing condition) for a certain period after the gas reaction is completed, so that the laminated mixture can be easily deformed by applying an external force. Thus, the mixture can be attracted in a suction direction by sucking when the laminated mixture remains in the flowing condition. Also, if the mixture is impregnated into another foamed body or a part of a textile material by pressing in one with the foamed body or the textile material when the laminated mixture remains in the flowing condition, the foamed body or the textile material is fixed on a foamed body formed by the mixture and is integrated with the foamed body of the mixture. Moreover, if the compressibility is changed in the mixture, the resulting foamed body has a hard portion at the high compressibility and has a soft portion at the low compressibility.

As aforementioned, the impregnated layer having low air permeability is formed between the laminated mixture 12 and the foamed body 10 so that the whole thereof results in a composite material having low air permeability, and thus, when the inside of the pressure applying mold 15 is evacuated in the step of pressing and compressing, the suction force acts on the composite material having the low air permeability to produce a large pressure difference between the inside of the composite material and the suction side. Thus, as shown in FIGS. 3A and 3B, the liquid foamable mixture in the viscoelastic flowing condition is attracted together with the surface material toward the suction side and the surface material 2 is pushed on the lower surface 16 of the pressure applying mold 15 in relation to a reactive force produced by pressing and compressing so that the surface material 2 can follow the molding surface of the pressure applying mold 15.

When this, the liquid foamable mixture 12 is not separated from the first foamed body 10 during sucking the liquid foamable mixture. As aforementioned, this is because the impregnated layer is formed by impregnating a part of the liquid foamable mixture into the surface of the first foamed body 10 when the liquid foamable mixture is injected and laminated on the first foamed body 10. It should be noted that it is possible to penetrate the liquid foamable mixture 12 through the surface material (which has air permeability) during the suction, however, such a penetration is not caused by carrying out the suction and the pressing and compressing after elapsing a certain period (about 50 seconds when using a seat commonly used as shown in the figure and the aforementioned liquid foamable mixture) after the mixture 12 is injected and laminated on the first foamed body 10. Also, the mixture can not penetrate through the surface material by attaching a plate material of a slab urethane foam on a back surface of the surface material.

Then, the liquid foamable mixture 12 is transformed into a solid so that the second foamed body having a desired resiliency is formed and the back surface of the surface material 2 is fixed on the upper side thereof and the first foamed body 10 is fixed on the lower side thereof in one with the first foamed body, and thus, the seat of the present invention is completely manufactured.

In this embodiment, the shape about a deep channel which is crushed and can not be formed in dependent on a mold in the conventional technique has been described. However, in accordance with the present invention, when not only such a channel but also a three dimensional shape or a concave and convex shape is formed, a desired shape can be similarly formed. A portion which is formed into a desired shape following a mold by sucking the liquid foamable mixture together with the surface material as mentioned in the above is called as a sucked molding portion.

As aforementioned, while a surface material can not follow the lower surface of the pressure applying mold by sucking because the surface material has air permeability, a seat covered with the surface material which has a shape corresponding to the pressure applying mold and is integral with the foamed body can be manufactured in accordance with the manufacturing steps of the present invention.

Figure 4:
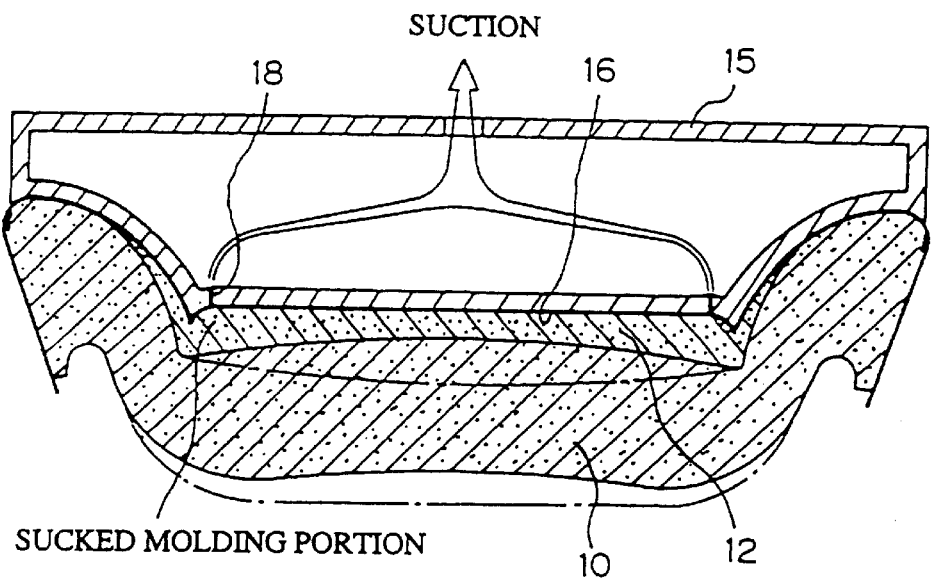
FIG. 4 is a cross sectional view of an arrangement of a first foamed body, a liquid foamable mixture injected and laminated thereon, a surface material covered thereon, and a pressure applying mold, wherein the first foamed body is sucked through suction slots of the pressure applying mold and is lifted up by this suction.

However, there is a problem as a possibility. That is, because the liquid foamable mixture in the visco-elastic flowing condition is easily compressed and because an impregnated layer is formed so that the first foamed body 10 and the mixture are entirely resulted in a composite material having low air permeability as aforementioned, air around the first foamed body 10 pushes the whole of the first foamed body 10 on the pressure applying mold 15 by a pressure difference produced by sucking. Thus, as shown in FIG. 4, the first foamed body 10 rises up toward the mixture 12 and the whole of the mixture 12 is crushed so that the thickness thereof is thinned, and then the mixture 12 becomes hard so that a feeling of the seat surface is worse.

Such a problem can be solved by supplying the same amount of air corresponding to an amount of air sucked through the suction slot to a portion other than a portion of the liquid foamable mixture attracted by sucking.

Figure 5:
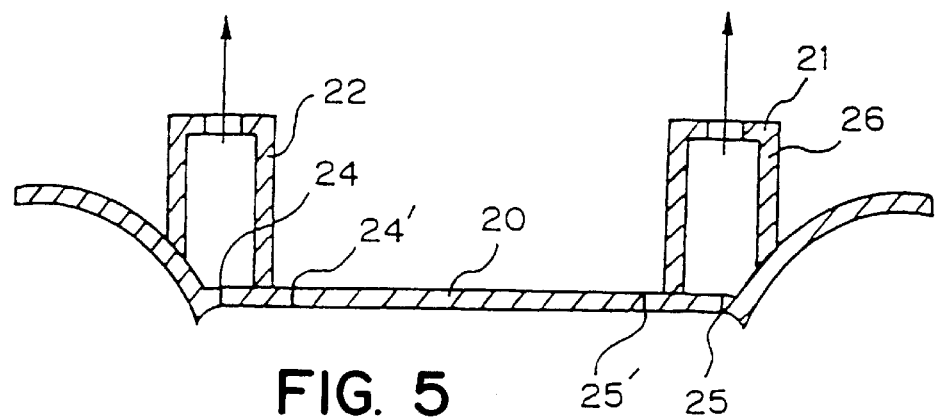
FIG. 5 is a cross sectional view of a pressure applying mold used for an embodiment of the present invention.

A preferred example of a pressure applying mold for carrying out this fact is shown in FIG. 5. FIG. 5 is a cross sectional view of the pressure applying mold. This pressure applying mold 20 has suction slots 24, 25 provided at portions corresponding to the respective sucked molding portions and decompression spaces provided behind the suction slots 24, 25. The suction is carried out through the suction slots 24, 25 by decompressing the decompressing spaces. Moreover, air intake slots 24', 25' are aligned in one line each about the respective suction slots 24, 25. Air inside and outside of the pressure applying mold is freely communicated through those air intake slots 24', 25'.

The number and the size of the respective suction slots 24, 25 can be determined as similar to that of the pressure applying mold shown in FIG. 3.

Figure 6:
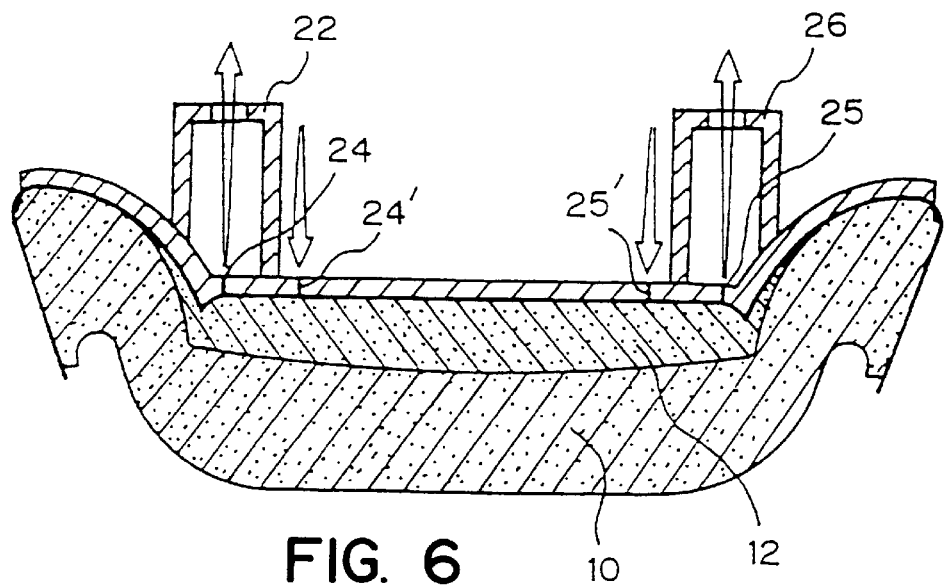
FIG. 6 is a cross sectional view of an arrangement of manufacturing a seat of the present invention by use of a pressure applying mold shown in FIG. 5.

FIG. 6 shows an arrangement of manufacturing a seat by use of this pressure applying mold 20.

As similar to that of FIG. 3, the liquid foamable mixture 12 is injected and laminated on the first foamed body 10, and then, the pressure applying mold 20 positioned above the surface material 2 covering on the liquid foamable mixture is lowered. When this, the decompressing rooms 22, 26 are decompressed to suck through the suction slots 24, 25.

When the pressure applying mold 20 contacts with the mixture 12 and a pressure difference is created thereby, the liquid foamable mixture 12 is attracted together with the surface material 2 toward the pressure applying mold 20 and the first foamed body 10 is simultaneously raised by air around the first foamed body 10 with the pressure difference. When this, air is naturally supplied through the air intake slots 24', 25' from the inside (the upper side in the figure) of the pressure applying mold 20 to the outside (the lower side in the figure) thereof so that the pressure difference can be compensated. By this air supplement, a pressure difference capable of rising up the first foamed body 10 is eliminated.

Then, the liquid foamable mixture is sucked and molded but is not compressed by raising the first foamed body 10 as aforementioned.

Number, sizes, shapes and positions of the respective air intake slots 24', 25' of the pressure applying mold 20 can be determined so that a required amount of air can be supplied to the lower side of the pressure applying mold so as not to raise the first foamed body 10.

Figure 7:
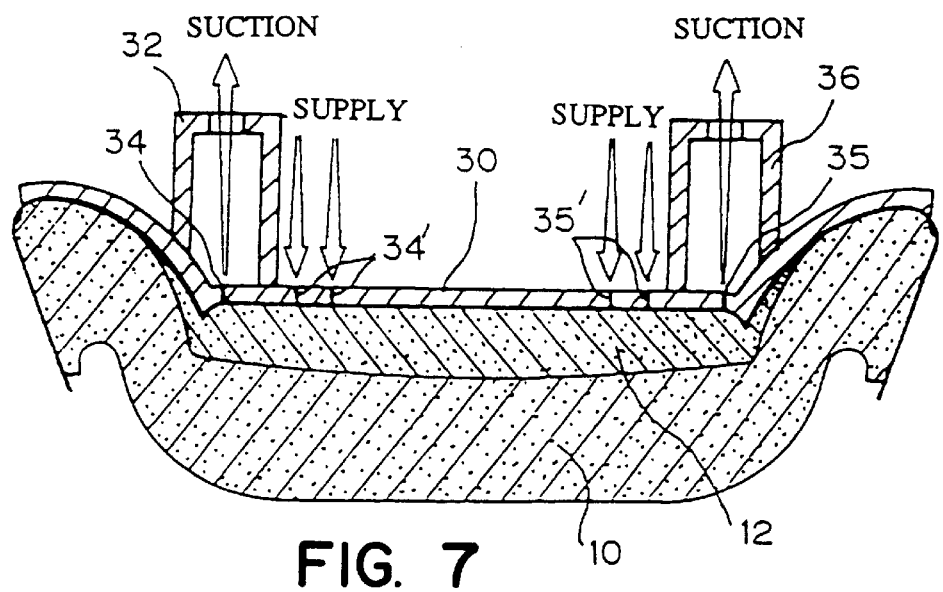
FIG. 7 is a cross sectional view for an arrangement of manufacturing a seat of the present invention by use of another pressure applying mold.

FIG. 7 shows a sucked molding by use of another pressure applying mold. A pressure applying mold 30 shown is similar to the pressure applying mold shown in FIG. 6 and has suction slots 34, 35 provided at positions corresponding to the respective sucked molding portions and decompression spaces 32, 36 provided behind (above in the figure) the suction slots 34, 35. Moreover, air intake slots 34', 35' are aligned in two lines each about the respective decompression spaces.

An embodiment by use of the pressure applying mold of FIG. 7 is as follows.

Diameters of the suction slots 34, 35 are 2 mm, respectively, and those are aligned in a line with 10 mm interval, and the decompression spaces are connected with a vacuum pump (not shown).

Diameters of the air intake slots 34', 35' are 1 mm and 2 mm, respectively, and those are aligned in two lines with 10 mm interval.

A foamable mixture of a soften foamed polyurethane foam which forms the second foamed body is coated on the first foamed body 10 by a spraying method for 15 seconds (350 g), and then, the mixture is covered with a surface material after elapsing 20 seconds after completing the coating.

After 50 seconds after completing the coating, the decompression spaces 32, 36 of the pressure applying mold 30 is decompressed (0.08–0.21 atm), and simultaneously, the mixture 12 is pressed and compressed in the pressure applying mold 30 and the first foamed body, and then it is held for 15 minutes. During this, the pressure applying mold is heated at 85° C. in order to enhance a reaction of the mixture 12 and the solidification thereof.

Thereby, the surface material and the second foamed body, and the second foamed body and the first foamed body are integrally formed with another, respectively, and thus, a seat in which the second foamed body is not crushed, the seat surface follows a shape of the molding surface of the pressure applying mold and the seat has the air permeability with a good surface feeling is manufactured.

In the aforementioned manufacturing steps, if the liquid foamable mixture is laminated on the upper surface 11 of the first foamed body 10 in the same thickness, the degree of hardness is higher in the circumferential portion and is constant over the central portion because the compressibility of the liquid foamable mixture at a portion corresponding to the circumferential portion is higher than that of the central portion.

A seat of the present invention has air permeability and a good surface feeling because the foamed body is covered with a surface material having air permeability.

Moreover, the seat has a desired surface shape following a shape of the molding surface of the pressure applying mold because the second foamed body is molded by sucking through the suction slot of the pressure applying mold and simultaneously pushing the surface material on the molding surface of the pressure applying mold without crushing the liquid foamable mixture when the mixture is pressed and compressed by use of the pressure applying mold.

As an effect other than those effects, when a person sits on the seat, the soft resiliency of the foamed body makes the person comfortable because the surface material is integral with the second foamed body and the second foamed body is integral with the first foamed body. In addition, the surface material is tensioned by the weight of the person, and when the weight is released, the surface material is restored into the original state by the resiliency of the foamed body so that the surface material can not be crumpled.

Moreover, when the circumferential portion of the seat is harder than the central portion thereof, the shape of the seat can be maintained and the holding ability thereof is improved without making the person uncomfortable.

Also, the foamed body comprises two foamed bodies integral with another, and when the lower layer of the foamed body which does not directly contact the person is hard, the weight of the person can be supported without making the person uncomfortable.

The surface material which contacts with the person is molded by only one surface material so that it is not necessary to cut into several surface members, and thus, number of structural parts and materials are reduced and the manufacturing steps are also facilitated, and an entire manufacturing cost can be reduced thereby.

Furthermore, each foamed body is integral with another, and thus, the work for assembling each foamed body is not necessary so that the load used for such a work can be reduced.

What is claimed is:

1. A method for manufacturing a seat in which said seat comprises an air permeable surface material and a foamed body integrally formed with the surface material and the foamed body has an outline generally corresponding to an outline of the seat and comprises a first foamed body as a base thereof and a second foamed body integrally formed with the first foamed body, comprising the steps of:

injecting and laminating a liquid foamable mixture, which forms said second foamed body, on a front surface of said first foamed body;

disposing said surface material on said first foamed body;

pressing and compressing said laminated liquid foamable mixture in said first foamed body and a pressure applying mold having a shape corresponding to a shape of a central portion of said seat and positioned on said surface material and simultaneously sucking a portion of said liquid foamable mixture through a suction slot provided in said pressure applying mold while supplying air to another portion of said liquid foamable mixture, when said laminated liquid foamable mixture has completed a gas reaction thereof but is still in a visco-elastic flowing condition.

2. A method of claim 1, wherein the compressibility to said liquid foamable mixture is partially changed when said liquid foamable mixture has completed the gas reaction thereof but is still in the visco-elastic flowing condition in said step of pressing and compressing, whereby the degree of hardness of said first foamed body is partially changed.

3. A method of claim 1, wherein said compressibility is partially changed by changing space between said pressure applying mold and said first foamed body, injecting and laminating said liquid foamable mixture on said first foamed body in the same thickness and then pressing and compressing.

4. A method of claim 1, wherein said surface material comprises a central surface portion having air permeability and side surface portions continued therefrom, wherein said central surface portion is integral with said second foamed body and said first foamed body has sides covered with said side surface portions.

5. A method of claim 1, wherein the degree of hardness of said first foamed body is different from that of said second foamed body.

6. A method of claim 1, wherein said first and said second foamed bodies are molded by a reactive foamable resin selected from a group consisting of a polyurethane foam and a polyurea foam.

7. A method of claim 1, wherein said surface material is selected from a group consisting of a fabric and a knitted textile material having air permeability.

8. A method of claim 1, wherein a plate material of a slab urethane foam is provided on a back surface of said surface material.

9. A method of claim 1, wherein said step of injecting and laminating said liquid foamable mixture is carried out before said step of disposing said surface material.

10. A method of claim 9, wherein said step of disposing said surface material is carried out by covering said laminated liquid foamable mixture with said surface material so that said laminated liquid foamable mixture is inserted.

11. A method of claim 1, wherein said sucking in said pressure applying mold is carried out by a part of said suction slot and air permeability between an inside and an outside of said pressure applying mold is freely communicated through another part of said suction slot.

12. A method of claim 11, wherein there are a plurality of suction slots and a part thereof are positioned at a position corresponding to a sucked molding portion of said second foamed body, and said sucking is carried out by said part of said suction slots and the air permeability between the inside and the outside of said pressure applying mold is freely communicated through another part thereof.

13. A method of claim 11 or 12, wherein a decompression space is provided behind a part of said suction slot to suck by decompressing said decompression space.

14. A method of claim 13, wherein a decompression room is provided behind a part of said suction slot to suck by decompressing said decompression room.

* * * * *

UNITED STATES PATENT AND TRADEMARK OFFICE
CERTIFICATE OF CORRECTION

PATENT NO. : 6,274,069 B1
DATED : August 14, 2001
INVENTOR(S) : Taro Ogawa et al.

It is certified that error appears in the above-identified patent and that said Letters Patent is hereby corrected as shown below:

Column 12,
Line 57, the numeral "13" should be -- 12 --.

Signed and Sealed this

Ninth Day of August, 2005

JON W. DUDAS
*Director of the United States Patent and Trademark Office*